United States Patent
Karandikar et al.

(10) Patent No.: US 10,676,100 B2
(45) Date of Patent: Jun. 9, 2020

(54) RUNTIME VERIFICATION OF SHUTOFF CONTROL LINE INTEGRITY IN A HYBRID VEHICLE SYSTEM

(71) Applicants: Mayuresh Karandikar, Rochester Hills, MI (US); Shawn X Duan, Rochester, MI (US); Feisel Weslati, Troy, MI (US)

(72) Inventors: Mayuresh Karandikar, Rochester Hills, MI (US); Shawn X Duan, Rochester, MI (US); Feisel Weslati, Troy, MI (US)

(73) Assignee: FCA US LLC, Auburn Hills ( * ) Notice: Subject to any disclaimer, the term of this patent is extended or adjusted under 35 U.S.C. 154(b) by 345 days.

(21) Appl. No.: 15/788,250

(22) Filed: Oct. 19, 2017

(65) Prior Publication Data

US 2019/0118828 A1    Apr. 25, 2019

(51) Int. Cl.
| | |
|---|---|
| *B60W 50/00* | (2006.01) |
| *B60W 50/038* | (2012.01) |
| *B60W 20/50* | (2016.01) |
| *B60L 3/00* | (2019.01) |
| *B60W 10/08* | (2006.01) |
| *B60W 20/10* | (2016.01) |
| *B60L 50/15* | (2019.01) |
| *B60L 3/04* | (2006.01) |

(52) U.S. Cl.
CPC ......... *B60W 50/038* (2013.01); *B60L 3/0061* (2013.01); *B60L 3/0084* (2013.01); *B60L 3/0092* (2013.01); *B60L 3/04* (2013.01); *B60L 50/15* (2019.02); *B60W 10/08* (2013.01); *B60W 20/10* (2013.01); *B60W 20/50* (2013.01); *B60L 2240/423* (2013.01); *B60L 2240/443* (2013.01); *B60W 2710/083* (2013.01)

(58) Field of Classification Search
None
See application file for complete search history.

(56) References Cited

U.S. PATENT DOCUMENTS

| | | | |
|---|---|---|---|
| 6,078,173 A | 6/2000 | Kumar et al. | |
| 6,927,988 B2 * | 8/2005 | Cheng | B60L 3/003 363/56.04 |
| 9,043,623 B2 | 5/2015 | Martin et al. | |
| 2005/0256618 A1 * | 11/2005 | Hsieh | G01R 31/343 701/22 |

(Continued)

*Primary Examiner* — Truc M Do
(74) *Attorney, Agent, or Firm* — Ralph E Smith

(57) ABSTRACT

A control system and diagnostic method for a hybrid vehicle having a hybrid powertrain each utilize a controller comprising (i) a hybrid control processor (HCP) and (ii) a motor control processor (MCP), a monitoring circuit that is distinct from the controller and is configured to monitor operation of the HCP and the MCP, and a gate drive circuit that is distinct from the controller and the monitoring circuit and is configured to enable/disable torque output by the hybrid powertrain based on first, second, and third independent shutoff signals. A diagnostic method performs a shutoff line integrity verification routine by performing six steps corresponding to different combinations of shutoff signals in a predetermined test sequence. These shutoff signals are provided to three independent shutoff lines, which are connected between (i) the gate drive circuit and (ii) the HCP, the MCP, and the monitoring circuit, respectively.

18 Claims, 3 Drawing Sheets

(56) References Cited

U.S. PATENT DOCUMENTS

| | | | |
|---|---|---|---|
| 2008/0150573 A1* | 6/2008 | Fu | G01R 31/24 324/765.01 |
| 2009/0118916 A1* | 5/2009 | Kothari | B60W 20/10 701/53 |
| 2014/0062373 A1* | 3/2014 | Fukui | H02P 29/68 318/472 |
| 2016/0173094 A1* | 6/2016 | Choi | H03K 17/08128 327/109 |
| 2017/0050524 A1* | 2/2017 | Imai | B60L 3/0084 |
| 2017/0113678 A1* | 4/2017 | Oba | B60K 6/26 |
| 2018/0099574 A1* | 4/2018 | Zhou | H02M 7/5387 |
| 2018/0134280 A1* | 5/2018 | Takakura | B60K 6/445 |

* cited by examiner

RUNTIME VERIFICATION OF SHUTOFF CONTROL LINE INTEGRITY IN A HYBRID VEHICLE SYSTEM

FIELD

The present application generally relates to hybrid vehicles and, more particularly, to runtime verification of shutoff control line integrity in a hybrid vehicle system.

BACKGROUND

A hybrid vehicle typically includes a hybrid powertrain comprising an engine and an electric motor. Depending on the specific configuration of the hybrid powertrain, one or both of the engine and the electric motor are configured to generate propulsive torque. Conditions may arise where torque output of the hybrid powertrain needs to be disabled for safety reasons. A hardware shutoff line is typically utilized by a control system to disable the torque output of the hybrid powertrain. If the integrity of the hardware shutoff line is compromised, however, the controller will potentially be unable to disable the hybrid powertrain torque output. Accordingly, while such hybrid vehicle control systems work well for their intended purpose, there remains a need for improvement in the relevant art.

SUMMARY

According to one example aspect of the invention, a control system for a hybrid vehicle having a hybrid powertrain including an engine and a transmission having first and second electric motors is presented. In one exemplary implementation, the control system comprises: a controller comprising (i) a hybrid control processor (HCP) and (ii) a motor control processor (MCP), wherein the HCP is configured to determine a torque contribution from the engine and the first and second electric motors and to generate corresponding commands, and wherein the MCP is configured to control the first and second electric motors in response to the commands from the HCP; a monitoring circuit that is distinct from the controller and is configured to monitor operation of the HCP and the MCP; a gate drive circuit that is distinct from the controller and the monitoring circuit and is configured to enable/disable torque output by the hybrid powertrain based on first, second, and third independent shutoff signals; and first, second, and third independent shutoff lines connected between (i) the gate drive circuit and (ii) the HCP, the MCP, and the monitoring circuit, respectively, and configured to provide the first, second, and third shutoff signals to provide to improve the redundancy of the control system in enabling/disabling the output of torque by the hybrid powertrain.

In some implementations, the HCP, the MCP, the monitoring module, and the gate drive circuit are configured to perform a shutoff line integrity verification routine comprising: performing, via the first, second, and third shutoff lines, six test steps corresponding to different combinations of shutoff signals in a predetermined test sequence; comparing the output of the gate drive circuit to expected values for the predetermined test sequence; and detecting a malfunction of at least one of the first, second, and third shutoff lines based on the comparison.

In some implementations, the gate drive circuit is configured to disable torque output by the hybrid powertrain in response to the detecting of the malfunction of at least one of the first, second, and third shutoff lines. In some implementations, the shutoff line integrity verification routine is performed during a key-on or key-off event of the hybrid vehicle. In some implementations, the one of the HCP, the MCP, and the monitoring module associated with the malfunctioning shutoff line is further configured to temporarily reroute its associated shutoff signal via another of the HCP, the MCP, and the monitoring module such that vehicle availability increases in the case of the malfunctioning shutoff line.

In some implementations, the shutoff line integrity verification routine retries a particular test step or the entire predetermined test sequence in response to the malfunction of at least one of the first, second, and third shutoff lines. In some implementations, the shutoff line integrity verification routine retries the particular test step or the entire predetermined test sequence a threshold number of times before setting a fault or failure flag that disables the hybrid powertrain torque output.

In some implementations, the shutoff line integrity verification routine skips a particular test step or the entire predetermined test sequence in response to unreliable operating conditions of the hybrid powertrain. In some implementations, the shutoff line integrity verification routine logs skipped test steps and entire predetermined test sequences in an electrically erasable programmable read-only memory (EEPROM). In some implementations, the shutoff line integrity verification routine skips test steps or the entire predetermined test sequence a threshold number of times before setting a fault or a failure flag that disables the hybrid powertrain torque output.

According to another example aspect of the invention, a diagnostic method for hardware shutoff lines for a hybrid powertrain of a hybrid vehicle including an engine and an electrically variable transmission (EVT) having first and second electric motors is presented. In one exemplary implementation, the method comprises: performing, by a control system of the hybrid vehicle and to first, second and third independent shutoff lines, six test steps corresponding to different combinations of shutoff signals in a predetermined test sequence, the first, second, and third shutoff lines being connected between (i) a gate drive circuit of the control system and (ii) a hybrid control processor (HCP) of a controller of the control system, a motor control processor (MCP) of the controller, and a monitoring circuit of the control system, respectively; comparing, by the control system, the output of the gate drive circuit to expected values for the predetermined test sequence; and detecting, by the control system, a malfunction of at least one of the first, second, and third shutoff lines based on the comparison, wherein the HCP is configured to determine a torque contribution from the engine and the first and second electric motors and to generate corresponding commands, wherein the MCP is configured to control the first and second electric motors in response to the commands from the HCP, wherein the monitoring circuit is configured to monitor operation of the HCP and the MCP, and wherein the gate drive circuit is configured to enable/disable torque output by the hybrid powertrain based on the first, second, and third independent shutoff signals to provide to improve the redundancy of the control system in enabling/disabling the output of torque by the hybrid powertrain In some implementations, the method further comprises disabling, by the gate drive circuit, torque output by the hybrid powertrain in response to the detecting of the malfunction of at least one of the first, second, and third shutoff lines. In some implementations, the method further comprises detecting, by the control system a key-on or key-off event of the hybrid vehicle as a precondition for performing the six test steps. In some implementations, the method further comprises temporarily rerouting, by the one of the HCP, the MCP, and the monitoring module associated with the malfunctioning shutoff line, its associated shutoff signal via another of the HCP, the MCP, and the monitoring module such that vehicle availability increases in the case of the malfunctioning shutoff line.

In some implementations, the method further comprises retrying, by the control system, a particular test step or the entire predetermined test sequence in response to the malfunction of at least one of the first, second, and third shutoff lines. In some implementations, retrying the particular test step or the entire predetermined test sequence comprises retrying, by the control system, the particular test step or the entire predetermined test sequence a threshold number of times before setting a fault or failure flag that disables the hybrid powertrain torque output.

In some implementations, the method further comprises skipping, by the control system a particular test step or the entire predetermined test sequence in response to unreliable operating conditions of the hybrid powertrain. In some implementations, the method further comprises logging, by the control system, skipped test steps and entire predetermined test sequences in an electrically erasable programmable read-only memory (EEPROM). In some implementations, skipping test steps or the entire predetermined test sequence comprises skipping, by the control system, a threshold number of times before setting a fault or a failure flag that disables the hybrid powertrain torque output.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, a hybrid powertrain includes a hardware shutoff line that is utilized by a control system to disable torque output of the hybrid powertrain. If the integrity of this hardware shutoff line is compromised, the control system is unable to disable the hybrid powertrain torque output. An integrity verification or diagnostic could be performed on the hardware line. False verification or diagnostic failures, however, could result in a driver being unnecessarily stranded and unable to drive the hybrid vehicle. Some hybrid vehicles also include multiple independent shutoff lines, which makes integrity verification or diagnostics even more complex. Accordingly, systems and methods are presented for a runtime verification or diagnostic of hardware shutoff line integrity in a hybrid vehicle system.

Figure 1:
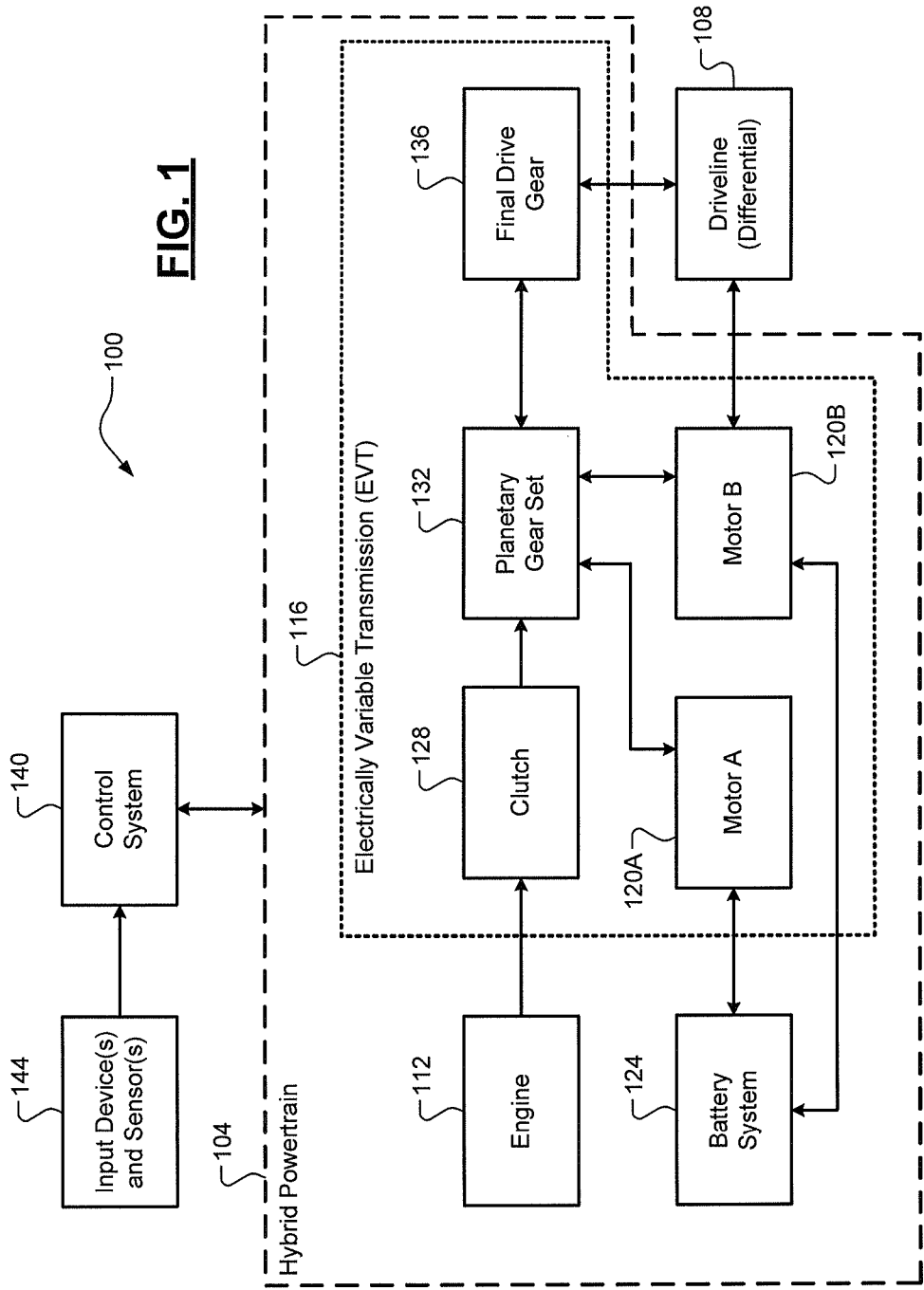
FIG. 1 is a functional block diagram of an example hybrid vehicle according to the principles of the present disclosure.

Referring now to FIG. 1, a functional block diagram of an example hybrid vehicle 100 is illustrated. The hybrid vehicle 100 includes a hybrid powertrain 104 that provides torque to a driveline 108 (e.g., a differential). In the illustrated exemplary implementation, the hybrid powertrain 104 comprises an engine 112 and an EVT 116. In one exemplary implementation, the engine 112 is an Atkinson cycle engine having a compression ratio of approximately 12.5:1. This type of engine 112 is able to utilize a maximum amount of power generated by combustion of an air/fuel mixture, thereby increasing performance of the hybrid vehicle 100. One drawback of this type of engine 112 is poor power/performance at low speeds. The EVT 116, however, is able to compensate for the poor power/performance of the engine 112 at low speeds.

The EVT 116 comprises electric motors 120A, 120B ("electric motors 120") powered by a battery system 124, a clutch 128, a planetary gear set 132, and a final drive gear 136. The engine 112 is selectively connected to the planetary gear set 132 via the clutch 128. Electric motor 120A is also connected to the planetary gear set 132, which in turn is connected to the driveline 108 via the final drive gear 136. Electric motor 120B is connected to both the planetary gear set 132 and directly to the driveline 108 such that the electric motors 120A, 120B and the planetary gear set 132 are able to achieve a wide range of gear ratios. The electric motors 120A, 120B are also configured to recharge the battery system 124 (e.g., via regenerative braking).

A control system 140 controls operation of the hybrid powertrain 104. This includes, but is not limited to, controlling combinations of the engine 112 and the clutch 128 and the electric motors 120A, 120B to achieve a desired torque output and a desired gear ratio of the EVT 116. The control system 140 receives inputs from a set of input devices and/or sensors 144. Non-limiting examples of these input device (s)/sensor(s) 144 include an accelerator pedal that provides a driver torque request, a key-on/key-off sensor for powering on/off the hybrid powertrain 104, engine/motor speed sensors, battery system state sensors, and the like. The control system 140 also includes three independent hardware lines for disabling powertrain torque output, as discussed in greater detail below.

Figure 2:
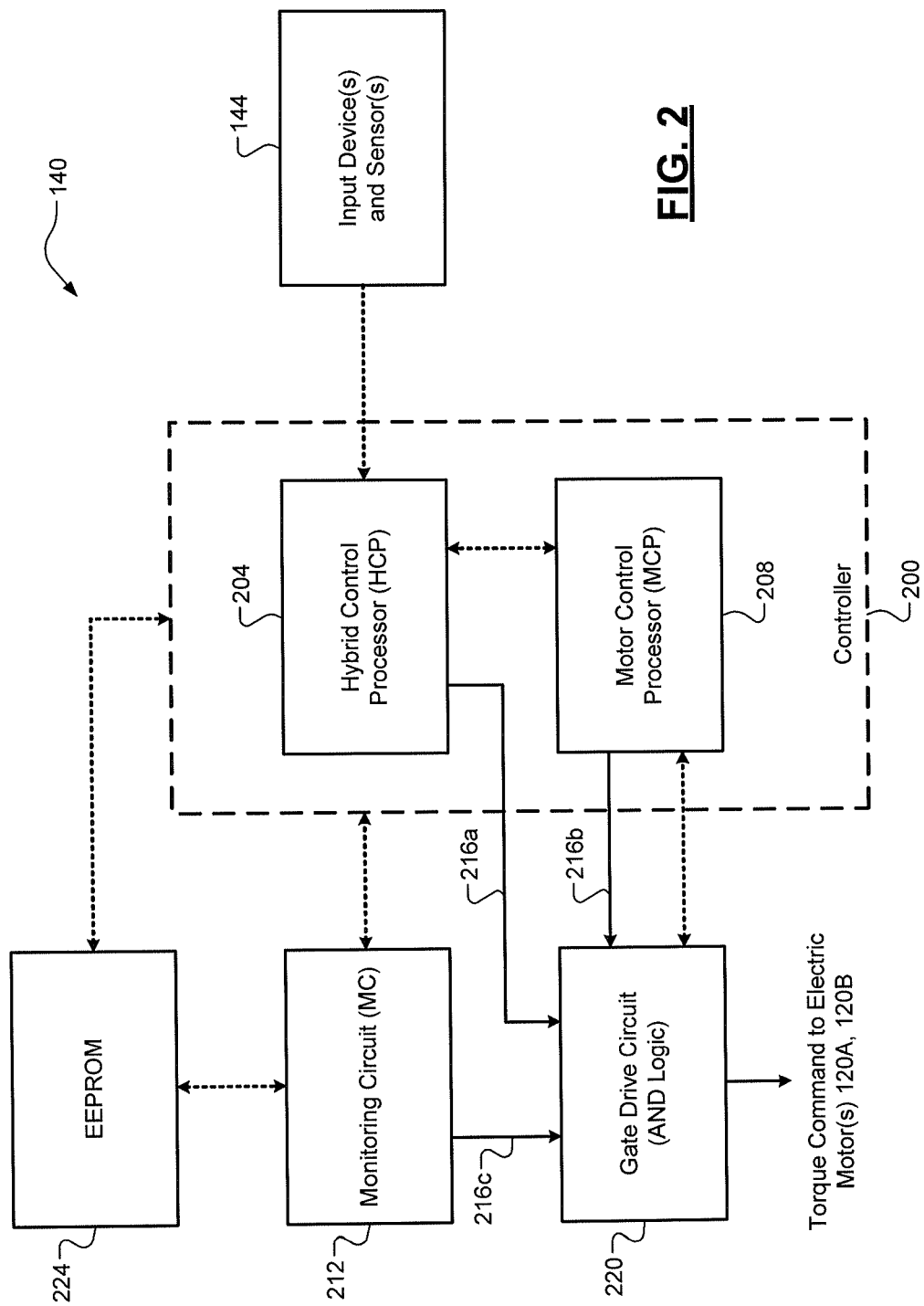
FIG. 2 is a functional block diagram of an example control system of the hybrid vehicle according to the principles of the present disclosure.

Referring now to FIG. 2, a functional block diagram of an example architecture of the control system 140 is illustrated. The control system 140 comprises a controller 200 that primarily controls the hybrid powertrain 104. As shown, the controller 200 includes two processors: a hybrid control processor (HCP) 204 and a motor control processor (MCP) 208. While shown as two processors, it will be appreciated that instead of two processors these devices 204, 208 could be two cores of a single, dual-core processor. The HCP 204 acts as a supervisory or master controller for the hybrid powertrain, including monitoring vehicle systems and determining how to achieve the desired torque output (e.g., based on data from the input device(s)/sensor(s) 144). The MCP 208 controls the hybrid powertrain 104 to achieve the desired torque output based on commands from the HCP 204. It will be appreciated that the MCP 208 only controls torque output of the electric motors 120 and that another controller (e.g., an engine control unit, or ECU; not shown) controls torque output of the engine 112. This ECU (not shown), for example, could be included in the input device (s)/sensor(s) 144 in communication with the HCP 204 (e.g., to exchange information). However, because the electric motors 120 are connected between the engine 112 and the driveline 108, the MCU 208 is able to control torque output of the hybrid powertrain 104 as a whole.

The control system 140 also includes a monitoring circuit M(C) 212 (e.g., an application-specific integrated circuit, or ASIC). The monitoring circuit 212 is a standalone device separate from the controller 200 that monitors both vehicle systems and the controller 200 (i.e., the HCP 204 and the MCP 208). Each of the HCP 204, the MCP 208, and the monitoring circuit 212 is able to disable powertrain torque output by providing an enable/disable signal via a respective independent shutoff line 216a, 216b, or 216c (collectively "shutoff lines 216"). These shutoff lines 216 are all connected to a gate drive circuit 220 (E.G., an ASIC) that performs an AND operation for each of the enable/disable signals. Thus, if one of more of the HCP 204, the MCP 208, and the monitoring circuit 212 are providing a disable signal via their respective shutoff line 216a, 216b, or 216c, powertrain torque output is disabled. An example predetermined test sequence is provided in Table 1 below:

TABLE 1

| Line 216c (MC) | Line 216a (HCP) | Line 216b (MCP) | Expected Output | Function Being Tested |
|---|---|---|---|---|
| DISABLE | ENABLE | ENABLE | DISABLE | MC DISABLE |
| ENABLE | ENABLE | ENABLE | ENABLE | MC ENABLE |
| ENABLE | DISABLE | ENABLE | DISABLE | HCP DISABLE |
| ENABLE | ENABLE | ENABLE | ENABLE | HCP ENABLE |
| ENABLE | ENABLE | DISABLE | DISABLE | MCP DISABLE |
| ENABLE | ENABLE | ENABLE | ENABLE | MCP ENABLE |

The predetermined sequence above in Table 1 is specifically designed to introduce intermediate ENABLE states to make sure that the expected output feedback transitions correctly and we don't have a false positive from a previous excitation step/sequence. Example scenarios where torque output of the hybrid powertrain needs to be disabled include a memory corruption or a total hardware failure, e.g., for one or both of the HCP 204 and the MCP 208. For example only, if the MCP 208 malfunctions and the HCP 204 is unable to disable the powertrain torque output via its corresponding hardware shutoff line 216a, then the hybrid powertrain 104 could inadvertently continue outputting torque. This is why standalone monitoring circuit 212 is necessary to monitor both the HCP 204 and the MCP 208. On power-up (key-on) and/or power-down (key-off) of the hybrid vehicle 100, a diagnostic routine is executed that tests each of the shutoff lines 216 by providing a sequence of enable/disable signals and comparing the output of the gate drive circuit 220 to expected results.

There may be scenarios, however, where fails failures prevent the hybrid powertrain 104 from operating, thereby stranding the driver of the hybrid vehicle 104. The diagnostic routine therefore provides for both retrials, either of specific steps in the test sequence or of the entire test sequence, and skipping of steps or the entire test sequence. Retrial of specific steps or the test sequence could be performed a threshold number of times before a fault or failure flag is finally set that disables hybrid powertrain torque output. Some steps may need to be skipped, for example, due to operating conditions that prevent the test step/sequence from being reliably performed. Non-limiting examples of these operating conditions include voltages at the devices 204, 208, 212 being too high or there being an insufficient power-up time during which the test steps/sequence can be reliably performed. When test steps or the entire test sequence is skipped, a record is logged (e.g., in an electrically erasable programmable read-only memory, or EEPROM 224). By tracking the skipping of test steps or the entire test sequence, the hybrid powertrain 104 is able to continue operating. However, after a threshold number of step/sequence skips has occurred, a fault or failure flag may be set that disables hybrid powertrain torque output.

To further improve the reliability of the hybrid powertrain 104, the control system 140 is also configured to temporarily reroute shutoff functionality for a particular shutoff line 216 that has malfunctioned. Because the HCP 204, the MCP 208, and the monitoring module 212 are each in communication with each other, one of the devices having an associated malfunctioning shutoff line is able to reroute its enable/disable signal through one of the other devices. For example, if the shutoff line 216b associated with the MCP 208 is determined to be malfunctioning, the MCP 208 could reroute its enable/disable signal through the HCP 204 or the monitoring module 212. Thus, if the HCP 204 was providing an enable signal but received a rerouted disable signal from the MCP 208, the HCP 204 could provide a disable signal to the gate drive circuit 220 via shutoff line 216a, thereby disabling powertrain torque output. This rerouting, however, is only a temporary solution (e.g., until a next key-off or power-off event) and the fault or failure flag would need to eventually be set.

Figure 3:
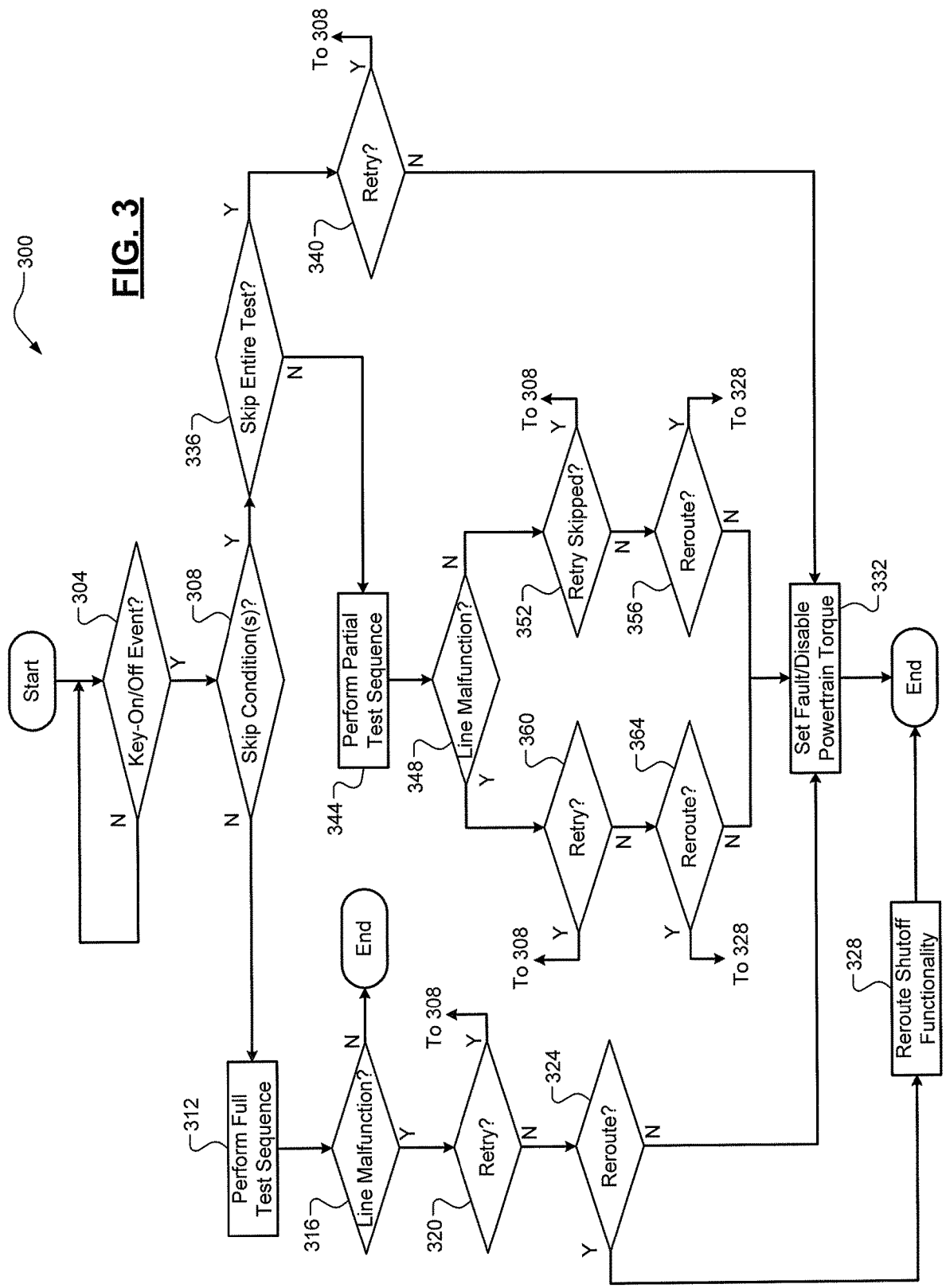
FIG. 3 is a flow diagram of an example method for runtime verification of shutoff control line integrity in a hybrid vehicle system according to the principles of the present disclosure.

Referring now to FIG. 3, a flow diagram of an example method 300 for runtime verification of shutoff control line integrity in a hybrid vehicle system is presented. At 304, the control system 140 determines whether a key-on (power-on) or key-off (power-off) event is occurring (e.g., based on input from the input device(s)/sensor(s) 144). If true, the method 300 proceeds to 308. Otherwise, the method 300 ends or returns to 304. It will be appreciated that there could also be other suitable preconditions for performing the shutoff control line integrity verification method 300. At 308, the control system 140 determines whether any operational conditions are present (bus voltage too high, insufficient time to perform the test, etc.). If false, the method 300 proceeds to 312 where the control system 140 performs the entire test sequence. If true, the method 300 proceeds to 336, which is discussed in greater detail below.

After 312, the control system 140 determines whether there is a malfunction of one or more of the shutoff lines 216 at 316. If false, the method 300 ends or returns to 304. If true, however, the method 300 proceeds to 320. At 320, the control system 140 determines whether a retry of at least a portion of the predetermined test sequence can be performed (e.g., if the threshold number of retries has yet to be reached). If true, the method 300 returns to 308. Otherwise, the method 300 proceeds to 324 where the control system 140 determines whether the shutoff functionality for the malfunctioning shutoff line(s) 216 can be temporarily rerouted through another one of the devices 204, 208, 212. If true, the control system 140 temporarily rerouted at 328 and the method 300 can end or return to 304. If false, however, the control system 140 sets a fault or failure flag to disable hybrid powertrain torque output at 332 and the method 300 then ends or returns to 304.

At 336, the control system 140 determines whether the entire predetermined test sequence needs to be skipped due to the unreliable operating conditions. If true, the method 300 proceeds to 340 where the control system 140 determines whether the entire predetermined test sequence can be retried (e.g., if the threshold number of retries has yet to be reached). If true, the method 300 returns to 308. If false, however, the method 300 proceeds to 332 where the control system 140 sets the fault or failure flag to disable hybrid powertrain torque output. If the control system 140 determines that the entire test does not need to be skipped at 336, the method 300 proceeds to 344 where the control system 140 performs a partial test (i.e., only some steps of the predetermined test sequence).

At 348, the control system 140 determines whether any of the test steps indicated a malfunction of one or more of the shutoff lines 216. If false, the method 300 proceeds to 352. If true, however, the method 300 proceeds to 360. At 352, the control system 140 determines whether the skipped steps from the partial test can be retried (e.g., if the threshold number of retires has yet to be reached). If true, the method 300 returns to 308. Otherwise, the method 300 proceeds to 356 where the control system 140 determines whether the shutoff functionality of the malfunctioning shutoff line(s) 216 can be temporarily rerouted. If true, the method 300 proceeds to 328 where the temporary rerouting occurs. If false, however, the method 300 proceeds to 332 where the control system 140 sets the fault or failure flag to disable hybrid powertrain torque output. At 360, the control system determines whether a retry of the step(s) corresponding to the malfunctioning shutoff line(s) 216 can be retried (e.g., if a threshold number of retires has yet to be reached). If true, the method 300 returns to 308. Otherwise, the method 300 proceeds to 364 where the control system 140 determines if the shutoff functionality of the malfunctioning shutoff line(s) can be temporarily rerouted. If true, the method 300 proceeds to 328 where the temporary rerouting occurs. If false, however, the method 300 proceeds to 332 where the control system 140 sets the fault or failure flag to disable hybrid powertrain torque output.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a hybrid vehicle having a hybrid powertrain including an engine and an electrically variable transmission (EVT) having first and second electric motors, the control system comprising:
   a controller including (i) a hybrid control processor (HCP) and (ii) a motor control processor (MCP), wherein the HCP is configured to determine a torque contribution from the engine and the first and second electric motors and to generate corresponding commands, and wherein the MCP is configured to control the first and second electric motors in response to the commands from the HCP;
   a monitoring circuit that is distinct from the controller and is configured to monitor operation of the HCP and the MCP;
   a gate drive circuit that is distinct from the controller and the monitoring circuit and is configured to enable/disable torque output by the hybrid powertrain based on first, second, and third independent shutoff signals; and
   first, second, and third independent shutoff lines connected between (i) the gate drive circuit and (ii) the HCP, the MCP, and the monitoring circuit, respectively, and configured to provide the first, second, and third shutoff signals to improve redundancy of the control system in enabling/disabling the output of torque by the hybrid powertrain,
   wherein the HCP, the MCP, the monitoring module, and the gate drive circuit are configured to perform a shutoff line integrity verification routine comprising:
      performing, via the first, second, and third shutoff lines, six test steps corresponding to different combinations of shutoff signals in a predetermined test sequence;
      comparing the output of the gate drive circuit to expected values for the predetermined test sequence; and
      detecting a malfunction of at least one of the first, second, and third shutoff lines based on the comparison.

2. The control system of claim 1, wherein the gate drive circuit is configured to disable torque output by the hybrid powertrain in response to the detecting of the malfunction of at least one of the first, second, and third shutoff lines.

3. The control system of claim 2, wherein the shutoff line integrity verification routine is performed during a key-on or key-off event of the hybrid vehicle.

4. The control system of claim 3, wherein the one of the HCP, the MCP, and the monitoring module associated with the malfunctioning shutoff line is further configured to temporarily reroute its associated shutoff signal via another of the HCP, the MCP, and the monitoring module such that vehicle availability increases in the case of the malfunctioning shutoff line.

5. The control system of claim 3, wherein the shutoff line integrity verification routine retries a particular test step or the entire predetermined test sequence in response to the malfunction of at least one of the first, second, and third shutoff lines.

6. The control system of claim 5, wherein the shutoff line integrity verification routine retries the particular test step or the entire predetermined test sequence a threshold number of times before setting a fault or failure flag that disables the hybrid powertrain torque output.

7. The control system of claim 3, wherein the shutoff line integrity verification routine skips a particular test step or the entire predetermined test sequence in response to unreliable operating conditions of the hybrid powertrain.

8. The control system of claim 7, wherein the shutoff line integrity verification routine logs skipped test steps and entire predetermined test sequences in an electrically erasable programmable read-only memory (EEPROM).

9. The control system of claim 8, wherein the shutoff line integrity verification routine skips test steps or the entire predetermined test sequence a threshold number of times before setting a fault or a failure flag that disables the hybrid powertrain torque output.

10. A diagnostic method for hardware shutoff lines for a hybrid powertrain of a hybrid vehicle, the hybrid powertrain including an engine and an electrically variable transmission (EVT) having first and second electric motors, the method comprising:
   performing, by a control system of the hybrid vehicle and to first, second and third independent shutoff lines, six test steps corresponding to different combinations of shutoff signals in a predetermined test sequence, the first, second, and third shutoff lines being connected between (i) a gate drive circuit of the control system and (ii) a hybrid control processor (HCP) of a controller of the control system, a motor control processor (MCP) of the controller, and a monitoring circuit of the control system, respectively;

comparing, by the control system, the output of the gate drive circuit to expected values for the predetermined test sequence; and detecting, by the control system, a malfunction of at least one of the first, second, and third shutoff lines based on the comparison, wherein the HCP is configured to determine a torque contribution from the engine and the first and second electric motors and to generate corresponding commands, wherein the MCP is configured to control the first and second electric motors in response to the commands from the HCP, wherein the monitoring circuit is configured to monitor operation of the HCP and the MCP, and wherein the gate drive circuit is configured to enable/disable torque output by the hybrid powertrain based on the first, second, and third independent shutoff signals to provide to improve the redundancy of the control system in enabling/disabling the output of torque by the hybrid powertrain.

11. The diagnostic method of claim 10, further comprising disabling, by the gate drive circuit, torque output by the hybrid powertrain in response to the detecting of the malfunction of at least one of the first, second, and third shutoff lines.

12. The diagnostic method of claim 11, further comprising detecting, by the control system a key-on or key-off event of the hybrid vehicle as a precondition for performing the six test steps.

13. The diagnostic method of claim 12, further comprising temporarily rerouting, by the one of the HCP, the MCP, and the monitoring module associated with the malfunctioning shutoff line, its associated shutoff signal via another of the HCP, the MCP, and the monitoring module such that vehicle availability increases in the case of the malfunctioning shutoff line.

14. The diagnostic method of claim 12, further comprising retrying, by the control system, a particular test step or the entire predetermined test sequence in response to the malfunction of at least one of the first, second, and third shutoff lines.

15. The diagnostic method of claim 14, wherein retrying the particular test step or the entire predetermined test sequence comprises retrying, by the control system, the particular test step or the entire predetermined test sequence a threshold number of times before setting a fault or failure flag that disables the hybrid powertrain torque output.

16. The diagnostic method of claim 12, further comprising skipping, by the control system a particular test step or the entire predetermined test sequence in response to unreliable operating conditions of the hybrid powertrain.

17. The diagnostic method of claim 16, further comprising logging, by the control system, skipped test steps and entire predetermined test sequences in an electrically erasable programmable read-only memory (EEPROM).

18. The diagnostic method of claim 17, wherein skipping test steps or the entire predetermined test sequence comprises skipping, by the control system, a threshold number of times before setting a fault or a failure flag that disables the hybrid powertrain torque output.

* * * * *